(12) United States Patent
Birrer

(10) Patent No.: US 10,027,142 B2
(45) Date of Patent: Jul. 17, 2018

(54) POWER SUPPLY FOR CRITICAL RAILROAD EQUIPMENT

(71) Applicant: ABB Technology AG, Zurich (CH)

(72) Inventor: Markus Birrer, Untersiggenthal (CH)

(73) Assignee: ABB Schweiz AG, Baden (CH)

( * ) Notice: Subject to any disclaimer, the term of this patent is extended or adjusted under 35 U.S.C. 154(b) by 197 days.

(21) Appl. No.: 15/040,750

(22) Filed: Feb. 10, 2016

(65) Prior Publication Data

US 2016/0172881 A1 Jun. 16, 2016

Related U.S. Application Data

(63) Continuation of application No. PCT/EP2014/067743, filed on Aug. 20, 2014.

(30) Foreign Application Priority Data

Aug. 23, 2013 (EP) .................................... 13181453

(51) Int. Cl.
*B61L 1/00* (2006.01)
*H02J 7/00* (2006.01)
(Continued)

(52) U.S. Cl.
CPC ............. *H02J 7/0024* (2013.01); *B60M 5/00* (2013.01); *B61L 1/00* (2013.01); *B61L 5/00* (2013.01);
(Continued)

(58) Field of Classification Search
CPC .......... H02J 7/0024; B60M 5/00; B60M 3/00; B61L 1/00; B61L 5/00; B61L 29/00; B61L 99/00
(Continued)

(56) References Cited

U.S. PATENT DOCUMENTS 7,629,708 B1 * 12/2009 Meyers ...................... H02J 7/35
307/66
2005/0189889 A1 * 9/2005 Wirtz .................... H02M 7/003
318/105
(Continued)

FOREIGN PATENT DOCUMENTS

EP 2348800 A1 7/2011
WO 2012084501 A1 6/2012
WO 2012164099 A2 12/2012

OTHER PUBLICATIONS

European Search Report, EP13181453, dated Jan. 14, 2014, 6 pages.
(Continued)

*Primary Examiner* — Jason C Smith
(74) *Attorney, Agent, or Firm* — Taft Stettinius & Hollister LLP; J. Bruce Schelkopf

(57) ABSTRACT

A power supply system for an electrical equipment comprises a first power supply module for supplying power to the electrical equipment, wherein the first power supply module is connectable to a first electrical network and is adapted for converting a first input current from the first electrical network to an output current suppliable to the electrical equipment; a second power supply module for supplying electrical power to the electrical equipment, wherein the second power supply module is connectable to a second electrical network of different frequency and/or different voltage as the first electrical network and is adapted for converting a second input current from the second electrical network to the output current, when the first power supply module is not able to converting the first input current; and an electrical energy storage for supplying electrical power to the electrical equipment, wherein the electrical energy storage is adapted for providing the output
(Continued)

current, when the first and/or second power supply module is not able to convert the first and/or second input current.

20 Claims, 2 Drawing Sheets

(51) Int. Cl.
*B60M 5/00* (2006.01)
*B61L 5/00* (2006.01)
*B61L 29/00* (2006.01)
*B61L 99/00* (2006.01)
*B60M 3/00* (2006.01)

(52) U.S. Cl.
CPC ............... *B61L 29/00* (2013.01); *B61L 99/00* (2013.01); *B60M 3/00* (2013.01)

(58) Field of Classification Search
USPC ........................................................ 246/218
See application file for complete search history.

(56) References Cited

U.S. PATENT DOCUMENTS

| | | | |
|---|---|---|---|
| 2005/0200205 A1* | 9/2005 | Winn | H02J 9/062 307/64 |
| 2012/0326504 A1* | 12/2012 | Ballantine | H02J 3/006 307/24 |
| 2016/0172881 A1* | 6/2016 | Birrer | B61L 1/00 246/218 |

OTHER PUBLICATIONS

International Search Report, PCT/EP2014/067743, dated Nov. 26, 2014, 3 pages.
International Preliminary Report on Patentability, PCT/EP2014/067743, ABB Technology AG, dated Feb. 23, 2016.

* cited by examiner

POWER SUPPLY FOR CRITICAL RAILROAD EQUIPMENT

FIELD OF THE INVENTION

The invention relates to a power supply system for an electrical equipment and to a method for maintaining the power supply of an electrical equipment.

BACKGROUND OF THE INVENTION

An automatic train protection system in general railroad equipment (such as railroad switches, level crossing, railroad lighting) enables a safe operation for the entire vehicle fleet by supervising and controlling the position and the speed of all vehicles (trains) circulating on the railway network in real time.

As being safety relevant, an automatic train protection and railroad equipment system may require a secure power supply. For example, a power interruption at the input of such a system may cause the vehicles to stop operation. Therefore, an automatic train protection and railroad equipment system comprises usually a power supply system that is adapted to provide auxiliary power to the critical loads of the system for a predetermined amount of time. Such power supply systems are also called uninterruptable protection systems.

For example, such a power supply system may interface an available 50 Hz main network to the critical loads and may charge a battery pack while the 50 Hz main network is available. In the case of a power failure, the power supply system will still supply the critical loads via the associated battery pack.

Sometimes the auxiliary power is provided via a diesel electric generator, which may be expensive and poor with respect to an available power density.

DESCRIPTION OF THE INVENTION

It is an object of the invention to provide a reliable power supply system, in particular for railroad applications.

This object is achieved by the subject-matter of the independent claims. Further exemplary embodiments are evident from the dependent claims and the following description.

An aspect of the invention relates to a power supply system for an electrical equipment. The power supply system may be a power supply system in an automatic train protection and railroad equipment system. The electrical equipment may be (critical) loads, for example of a railroad system such as railroad switches, level crossing, railroad lighting that may be powered to securely maintain or shut down the operation of the complete railroad system.

According to an embodiment of the invention, the power supply system comprises a first power supply module for supplying power to the electrical equipment, wherein the first power supply module is connectable to a first electrical network and is adapted for converting a first input current from the first electrical network to an output current suppliable to the electrical equipment. The first electrical network may be a 50 Hz or 60 Hz network.

The power supply system may further comprise a second power supply module for supplying electrical power to the electrical equipment, wherein the second power supply module is connectable to a second electrical network of different frequency and/or different voltage as the first network and is adapted for converting a second input current from the second electrical network to the output current, for example, when the first power supply module is not able to convert its current. The second electrical network may be a 16⅔ Hz network.

The power supply system may further comprise a third power supply module for supplying electrical power to the electrical equipment, wherein the third power supply module is connectable to a third electrical network of different frequency and/or different voltage as the first and/or second network and is adapted for converting a third input current from the third electrical network to the output current, for example, when the first and/or second power supply module are not able to convert its input current. The third electrical network may be a DC network.

The power supply system may comprise the first and the second power supply module or may comprise the first and the third power supply module.

The redundancy may be further enhanced by a power supply system with the first, the second and the third power supply module. In this case, the power supply module may be seen as a triple voltage/triple frequency power supply system comprising at least three power supply modules, which are connected to at least three independent available electrical networks (having different voltages and/or eventually different frequencies). The power supply system may guarantee at least four redundancy levels to secure power to critical loads by, for example, power from a main network, power from a secondary network, power from a third network, and power from batteries. Additionally, the power supply system may comprise an electrical energy storage for supplying electrical power to the electrical equipment, wherein the electrical energy storage is adapted for providing the output current, when the first, second and/or third power supply module is not able to convert its input current.

For example, the first power supply module may comprise a first electrical battery, the second power supply module may comprise a second electrical battery and the third power supply module may comprise a third electrical battery. These batteries may all be part of the electrical energy storage.

The power supply system may comprise two or three redundant power sources. Two power supply models may be connected to two independent power networks, such as a 50 Hz or 60 Hz main electricity network and a 16⅔ Hz railroad network or a DC network. A third power source may be provided by an electrical energy storage such as a battery pack that may be loaded from one of the electrical networks.

The power supply system may be seen as a protection system for protecting the electrical equipment from sudden power failures. In the case of a power failure in one or both of the electrical networks, the power supply system may maintain the power supplied to the electrical equipment for a predefined time. In this time, for example, the loads connected to the power supply may be safely shut down.

Furthermore, in the case of a main power failure and a system failure associated with the electrical energy storage, a secured supply of the loads may be provided from the second electrical network. The critical loads may be connected to available and independent networks, thus making it possible draining from one or the other network available a power requested by the loads.

The power supply system may be seen as a dual voltage/dual frequency power supply system, comprising at least two power supply modules, which are connected with at least two independent available electrical networks (having different voltage and/or eventually different frequencies). The power supply system may guarantee at least three redundancy levels to secure power to critical loads by, for example, power from a main network, power from a secondary network, and power from batteries.

It has to be noted that there may be different reasons, why a power supply module may be not able to convert its input current. For example, the electrical network associated with the power supply module may have a power failure. As an alternative, the power supply module may have a failure or may be shut down, as during maintenance.

According to an embodiment of the invention, the electrical energy storage and/or the electrical batteries are adapted for being charged, when the first, second and/or third power supply module receives electrical power from the first, second and/or third network. For example, the electrical energy storage may comprise one or more battery packs that may be charged from the first, second and/or third electrical network.

According to an embodiment of the invention, the electrical energy storage and/or the respective electrical battery is electrically connected to a first, second and/or third inverter of the first, second and/or third power supply module, respectively, for generating the output current, when the first, second and/or third power supply modules are not able to convert its input currents. For example, the electrical energy storage or the respective electrical battery may provide a DC current that is converted to an AC output current by the respective inverter.

According to an embodiment of the invention, the electrical energy storage comprises a first electrical battery adapted for being charged by the first power supply module, a second electrical battery adapted for being charged by the second power supply module and/or the electrical energy storage comprises a third electrical battery adapted for being charged by the third power supply module. For example, at least one of the power supply modules may comprise a DC link that is used for charging the respective battery. When one, two or three of the energy supply modules may not receive power from the associated electrical network, the power from the first, second and/or third battery packs may be supplied to the respective converter and converted into the output current.

According to an embodiment of the invention, the first, second and/or third power supply module comprises a voltage booster for increasing a DC link voltage supplied to the first, second and/or third inverter. For example, also the electrical energy storage may be charged by the boosted DC voltage.

According to an embodiment of the invention, one of the input currents has a frequency of 50 Hz or 60 Hz, one of the input currents has a frequency of 16⅔ Hz; and/or one of the input currents is a DC current. For example, the first input current may be a 50 Hz or 60 Hz/230 V current, the second input current may be a 16⅔ Hz current and optionally the third current may be a DC current.

Near railroad applications, in many countries a second mains network is available that is completely independent from the normally available three-phase 50 Hz/230 V or 60 Hz/230 V network, such as a 16⅔ Hz/230 V Hz network or eventually AC and DC systems.

According to an embodiment of the invention, one of the input currents is a three-phase current. For example, the 50 Hz or 60 Hz input current is a three-phase current and the 16⅔ Hz current is a single phase current.

According to an embodiment of the invention, a power supply module comprises at least one of: an input rectifier; an input filter; a DC/DC battery charger; an output filter; and a local bypass switch for disconnecting the power supply module for bypassing the power supply module.

An input rectifier may be only necessary, when the associated input current is an AC current. The input filter may be an LC or LCL filter. The out stage of the power module may comprise an inverter and an LC or LCL output filter. It has to be noted that the first, second and/or third power supply module may be equally designed except the input rectifier, for example may comprise equal voltage boosters, equal electrical energy storages and equal inverters.

According to an embodiment of the invention, the power supply system further comprises a central bypass switch in the cabinet frame for bypassing all power supply modules simultaneously. Each power supply module may furthermore comprise a bypass switch for only bypassing the respective power supply module.

According to an embodiment of the invention, the power supply system further comprises a cabinet frame for supporting the first power supply module, the second power supply module and optionally third power supply module. All components of the two or three power supply modules may be arranged in one common cabinet frame. The electrical energy storage(s) and/or electrical batteries may be arranged separately from the cabinet frame. It may be possible that the electrical batteries of the power supply modules are arranged inside the cabinet. The above mentioned central bypass switch may be used for enabling service maintenance of the cabinet frame.

According to an embodiment of the invention, the power supply system further comprises a control device, which may comprise a controller bus in the cabinet frame and a controller in each power supply module (representing a decentralized parallel architecture), which control device is adapted to control the first, second and/or third power supply module and the electrical energy storage. The controller bus may for instance be a parallel bus. The control device may detect whether the two or three electrical networks have a power failure and may switch between the power supply modules for generating the output current.

A further aspect of the invention relates to a method for maintaining the power supply of an electrical equipment. It has to be understood that features of the method as described in the above and in the following may be features of the system as described in the above and in the following and vice versa. This method may be automatically performed by the control device of the power supply system.

According to an embodiment of the invention, the method comprises: supplying the electrical equipment with an output current from a first power supply module converting a first input current from a first electrical network; in the case, the first power supply module is not able to provide the output current, supplying the electrical equipment with the output current from a second and/or third power supply module converting a second and/or third input current from a second and/or third electrical network of a different frequency and/or voltage as the first electrical network; charging a first electrical battery from the first electrical network and a second and/or third electrical battery from the second and/or third electrical network; in the case, the first, second and third power supply modules are not able to provide the output current, supplying the electrical equipment with the output current from the first, second and/or third electrical battery.

In a normal operation mode, the first power supply module may generate the output current and the one or two further power supply modules may be switched off. In this operation mode also the electrical batteries may be charged. In the case of a failure of the first electrical network, the control device may switch from the first power supply module to the second or third power supply module. In the case also the second electrical network has a power failure, the control device may switch to the third power supply module or to the electrical energy storage.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

In principle, identical parts are provided with the same reference symbols in the figures.

DETAILED DESCRIPTION OF EXEMPLARY EMBODIMENTS

Figure 1:
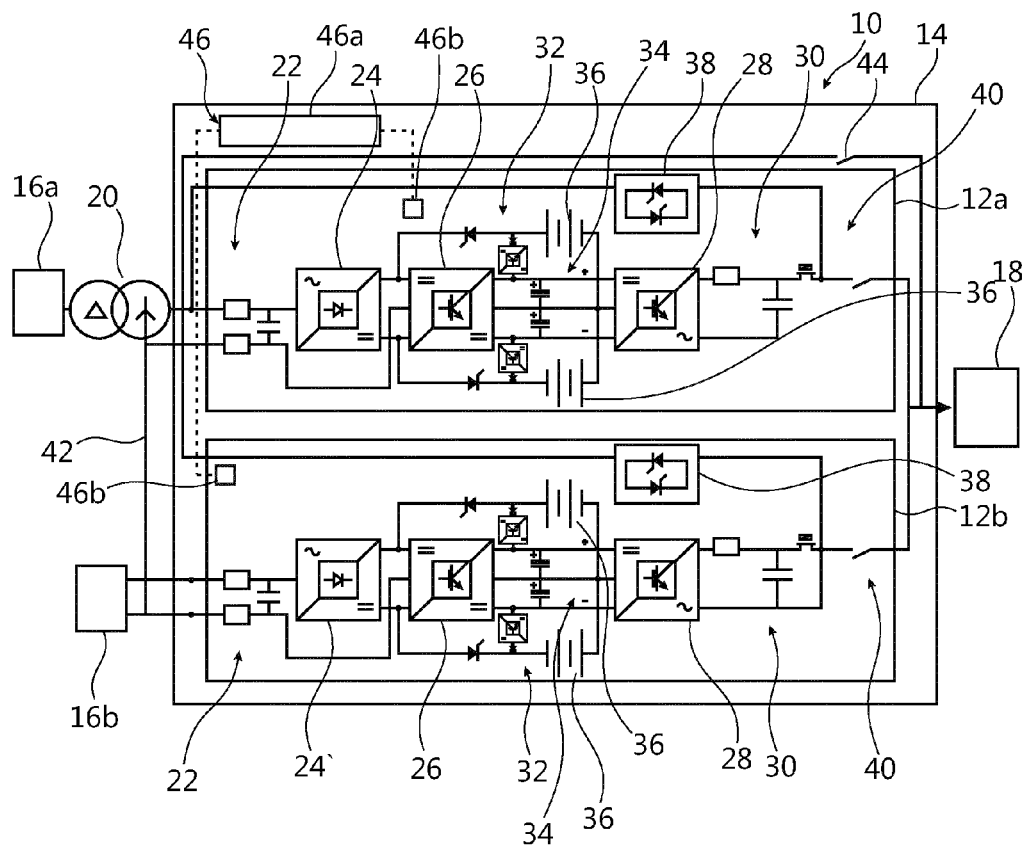
FIG. 1 schematically shows a power supply system according to an embodiment of the invention.

FIG. 1 shows a power supply system 10 with two power supply modules 12a, 12b that are arranged and supported in a common cabinet frame 14.

The first power supply module 12a is connected to a first electrical network 16a, which may provide a three-phase input current of 50 Hz/230 V or 60 Hz/230 V to the first power supply module 12a. The first power supply module 12a is adapted for converting the first input current into an output current to be supplied to electrical loads 18, for example loads of a railroad system, such as switches, sensors and lights.

A transformer 20 may be interconnected between the first electrical network 16a and the first power supply module 12a.

The first power supply module 12a comprises an LCL input filter 22, an input rectifier 24, a voltage booster 26, an inverter 28 and an LC output filter 30, which are electrically connected in this order. A DC/DC battery charger 32 is connected to a DC link 34 between the voltage booster 26 and the inverter 28.

The first power supply module 12a furthermore comprises two battery packs 36, which are connected to the positive and negative line of the DC link 32 respectively. The two battery packs may be arranged outside of the cabinet frame 14.

A bypass switch 38 may bypass the first power supply module 12a and may directly connect the loads 18 with the first electrical network 16a or the transformer 20. With a switch 40, the first power supply module 12a may be disconnected from the loads 18.

The second power supply module 12b is connected to a second electrical network 16b, which may provide a single phase 16⅔ Hz/230 V input current to the second power supply module 12b. Also the second power supply module 12b is adapted for converting the second input current into the output current to be supplied to the electrical loads 18.

A star point 42 of the transformer 20 may be connected to the neutral line of the second electrical network.

The second power supply module 12b may have the same components as the first power supply module 12a, only the input rectifier 24' may be different.

A common, central bypass switch 44 is positioned inside the cabinet frame 14, which is adapted for simultaneously bypassing the power supply modules 12a, 12b.

Additionally, the power supply system 10 comprises a control device 46, which may comprise a controller bus 46a, which may be positioned inside the cabinet frame 14, and a plurality of controllers 46b, wherein in each power supply module 12a, 12b a controller 46b may be positioned. The control device 46 may control the power supply modules 12a, 12b as will be described with respect to FIG. 3.

Figure 2:
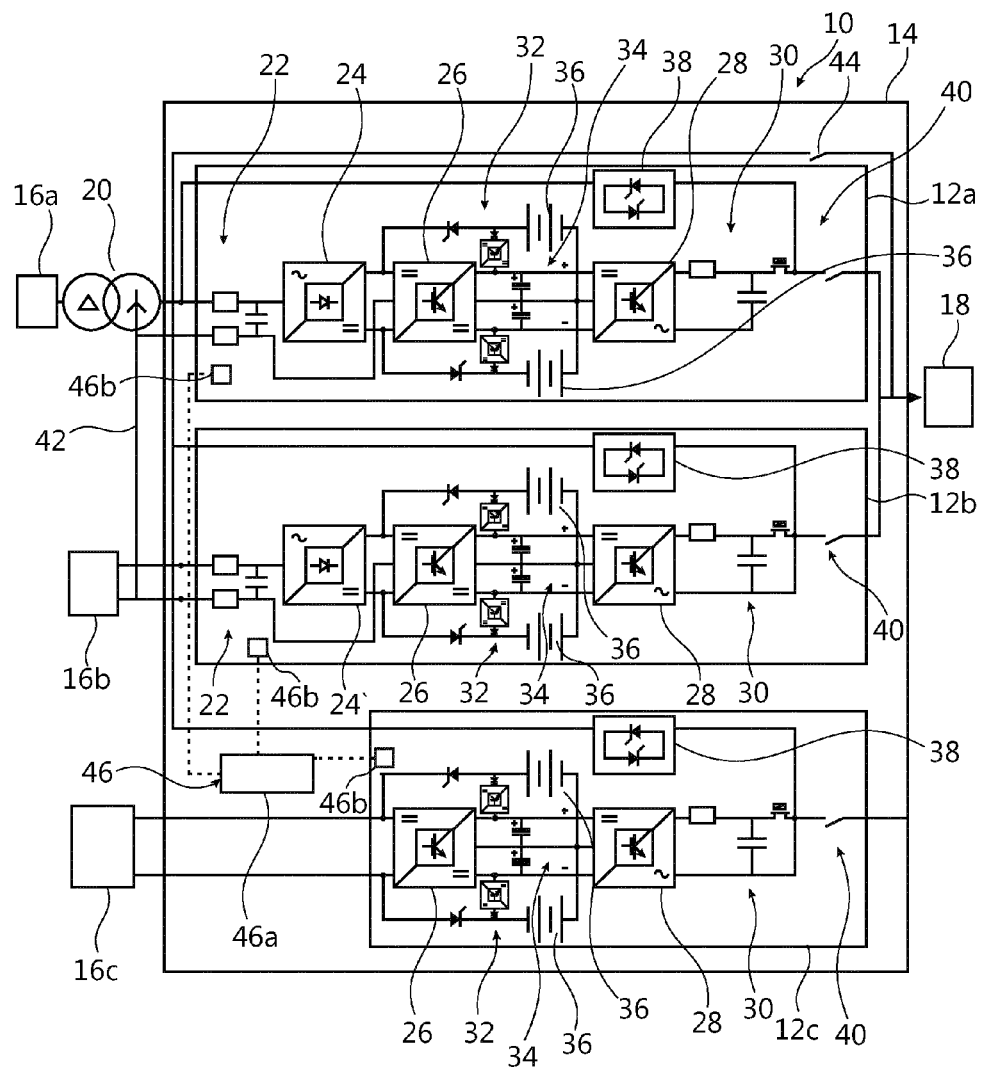
FIG. 2 schematically shows a power supply system according to a further embodiment of the invention.

FIG. 2 shows a further embodiment of a power supply system 10 that additionally to the power supply system of FIG. 1 comprises a third power supply module 12c that is connected to a third electrical network 16c, which may provide a DC current as third input current. The third power supply module 12c is adapted for converting the third input current into the output current to be supplied to the electrical loads 18.

The third power supply module 12c may have the same components as the first and second power supply modules 12a, 12b, only the input rectifier is missing.

A further embodiment of a power supply system 10 comprises only the power supply modules 12a and 12c.

The power supply system 10 may be operated in different operation modes that automatically may be set by the control device 46.

In a normal operation mode, the electrical networks 16a, 16b, 16c provide power and the power may be supplied to the loads by one of the power modules 16a, 16b. The control device 46, which may have a master/slave logic may control the power flow.

When one or two of the electrical networks 16a, 16b, 16c stop to provide power, the power supply system 10 may enter a second operation mode. In the second operation mode, a power supply module 12a, 12b, 12c not supplied by its network 16a, 16b, 16c is switched off and a power supply module 12a, 12b, 12c with a working electrical network 16a, 16b, 16c is used for supplying the loads 18 with power.

For example, the power may be supplied from the 50 Hz network, when the 16⅔ Hz network 16b or the DC network 16c is out of operation. When the 50 Hz network is out of operation, the power may be supplied from the 16⅔ Hz network 12b or from the DC network 16c.

In the case all electrical networks 16a, 16b, 16c are out of operation, the power supply system enters a third operation mode. In the third operation mode, the power is supplied to the loads 18 by the battery packs 36.

Figure 3:
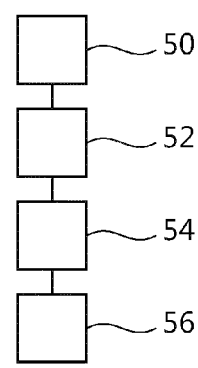
FIG. 3 shows a flow diagram for operating a power supply system according to an embodiment of the invention.

FIG. 3 shows a flow diagram for operating the power supply system 10 of FIGS. 1 and 2.

With the method, the power supply for the electrical loads 18 may be maintained in the case one or more of the electrical networks 16a, 16b, 16c have a power failure and/or one or more of the power supply modules 12a, 12b, 12c do not work.

In step 50, all electrical networks are operating. The electrical equipment 18 is supplied with an output current from the standard power supply module 12a converting the first input current from the first electrical network 16a. Alternatively, in this step, it is possible that the electrical equipment is supplied by the second or third power supply module 12b, 12c, for example, when the first power supply module has to be maintained. Also the second electrical network 16b or the third electrical network 16c may be the standard power source.

In step 52, the batteries 36 of the power supply system 10 are charged. The batteries 36 of the respective power module 12a, 12b, 12c may be charged by the power module 12a, 12b, 12c, when the corresponding electrical network 16a, 16b, 16c is operating. In particular, the batteries 36 of a power module 12a, 12b, 12c may be charged, when the power module is in standby mode, i.e. not providing the output current but the corresponding electrical network 16a, 16b, 16c is operating.

In step 54, in the case, the power supply module 12a, 12b, 12c is not able to convert its input current but electrical power from another network 16a, 16b, 16c is available, the power module 12a, 12b, 12c is switched off and another power module with an operating network 16a, 16b, 16c is switched on.

In step 56, in the case, all power supply modules 12a, 12b, 12c are not able to convert input currents, the electrical loads 18 are supplied with power from the batteries 36. In the event of a double fault on both independent networks 16a, 16b (FIG. 1) or a triple fault (FIG. 2), the electrical energy storage (i.e. associated battery pack) 36 provides the power supplied to the loads.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A power supply system for an electrical equipment, the power supply system comprising:
    a first power supply module for supplying power to the electrical equipment; and
    a second power supply module and/or a third power supply module for supplying power to the electrical equipment;
    wherein the first power supply module is connectable to a first electrical network, is adapted for converting a first input current with a frequency of 50 Hz or 60 Hz from the first electrical network to an output current suppliable to the electrical equipment and comprises a first electrical battery adapted for being charged by the first power supply module;
    wherein the second power supply module is connectable to a second electrical network, is adapted for converting a second input current with a frequency of 16⅔ Hz from the second electrical network to the output current and comprises a second electrical battery adapted for being charged by the second power supply module;
    wherein the third power supply module is connectable to a third electrical network, is adapted for converting a third DC input current from the third electrical network to the output current and comprises a third electrical battery adapted for being charged by the third power supply module;
    wherein the first, second and/or third power supply module comprises a voltage booster for increasing a DC link voltage supplied to a first, second and/or third inverter.

2. The power supply system of claim 1, wherein the first, second and/or third electrical battery is adapted for being charged, when the first, second and/or third power supply module receives electrical power from the first, second and/or third network.

3. The power supply system of claim 1,
    wherein, when the first, second and/or third second power supply modules are not able to convert the first, second and/or third input current, the first, second and/or third electrical battery is electrically connected to a first, second and/or third inverter of the first, second and/or third power supply module for generating the output current.

4. The power supply system of claim 1, wherein the first, second and/or third electrical battery is connectable to the DC link.

5. The power supply system of claim 1, wherein the first input current is a three-phase current.

6. The power supply system of claim 1,
    wherein the electrical equipment comprises loads of a railroad system.

7. The power supply system of claim 1, wherein the first, second and/or third power supply module comprising at least one of:
    an input rectifier, an input filter, a DC/DC battery charger, an output filter, and a local bypass switch for disconnecting the power supply module for bypassing the power supply module.

8. The power supply system of claim 1, further comprising:
    a central bypass switch for bypassing all power supply modules simultaneously.

9. The power supply system of claim 1, further comprising:
    a cabinet frame for supporting the power supply modules.

10. The power supply system of claim 1, further comprising:
    a control device, which is adapted to control the power supply modules.

11. A method for maintaining the power supply of an electrical equipment, the method comprising:
    supplying the electrical equipment with an output current from a first power supply module converting a first input current with a frequency of 50 Hz or 60 Hz from a first electrical network;
    in the case, the first power supply module is not able to convert the first input current, supplying the electrical equipment with the output current from a second power supply module converting a second input current with a frequency of 16⅔ Hz from a second electrical network and/or a third power supply module converting a third DC input current from a third electrical network;
    charging a first electrical battery by the first power supply module;
    charging one of a second electrical battery by the second power supply module or a third electrical battery by the third power supply module;
    in the case, the power supply modules are not able to convert the first and/or second input current, supplying the electrical equipment with power from at least one of the first, second and third electrical battery;
    wherein the first, second and/or third electrical battery is adapted for being charged, when the first, second and/or third power supply module receives electrical power from the first, second and/or third network;

wherein the first, second and/or third power supply module comprises a voltage booster for increasing a DC link voltage supplied to a first, second and/or third inverter;

wherein the first, second and/or third electrical battery is connectable to the DC link.

12. The power supply system of claim 1, wherein the first input current is a three-phase current;

wherein the electrical equipment comprises loads of a railroad system;

wherein the first, second and/or third power supply module comprising at least one of an input rectifier, an input filter, a DC/DC battery charger, an output filter, a local bypass switch for disconnecting the power supply module for bypassing the power supply module;

further comprising a central bypass switch for bypassing all power supply modules simultaneously;

further comprising a cabinet frame for supporting the power supply modules; and further comprising a control device, which is adapted to control the power supply modules.

13. The power supply system of claim 1, wherein the first input current is a three-phase current;

wherein the electrical equipment comprises loads of a railroad system;

wherein the first, second and/or third power supply module comprising at least one of an input rectifier, an input filter, a DC/DC battery charger, an output filter, a local bypass switch for disconnecting the power supply module for bypassing the power supply module;

further comprising a central bypass switch for bypassing all power supply modules simultaneously; and further comprising a cabinet frame for supporting the power supply modules.

14. The power supply system of claim 1, wherein the first input current is a three-phase current;

wherein the electrical equipment comprises loads of a railroad system;

wherein the first, second and/or third power supply module comprising at least one of an input rectifier, an input filter, a DC/DC battery charger, an output filter, a local bypass switch for disconnecting the power supply module for bypassing the power supply module; and further comprising a central bypass switch for bypassing all power supply modules simultaneously.

15. The power supply system of claim 1, wherein the first input current is a three-phase current;

wherein the electrical equipment comprises loads of a railroad system; and wherein the first, second and/or third power supply module comprising at least one of an input rectifier, an input filter, a DC/DC battery charger, an output filter, a local bypass switch for disconnecting the power supply module for bypassing the power supply module.

16. A power supply system for an electrical equipment, the power supply system comprising:

a first power supply module for supplying power to the electrical equipment;

a second power supply module and/or a third power supply module for supplying power to the electrical equipment;

wherein the first power supply module is connectable to a first electrical network, is adapted for converting a first input current with a frequency of 50 Hz or 60 Hz from the first electrical network to an output current suppliable to the electrical equipment and comprises a first electrical battery adapted for being charged by the first power supply module;

wherein the second power supply module is connectable to a second electrical network, is adapted for converting a second input current with a frequency of 16⅔ Hz from the second electrical network to the output current and comprises a second electrical battery adapted for being charged by the second power supply module;

wherein the third power supply module is connectable to a third electrical network, is adapted for converting a third DC input current from the third electrical network to the output current and comprises a third electrical battery adapted for being charged by the third power supply module; and a cabinet frame for supporting the power supply modules.

17. The power supply system of claim 16, wherein the first, second and/or third electrical battery is adapted for being charged, when the first, second and/or third power supply module receives electrical power from the first, second and/or third network.

18. The power supply system of claim 16, wherein, when the first, second and/or third second power supply modules are not able to convert the first, second and/or third input current, the first, second and/or third electrical battery is electrically connected to a first, second and/or third inverter of the first, second and/or third power supply module for generating the output current.

19. The power supply system of claim 16, wherein the first, second and/or third electrical battery is connectable to the DC link.

20. The power supply system of claim 16, wherein the electrical equipment comprises loads of a railroad system.

* * * * *